(12) United States Patent
Portman et al.

(10) Patent No.: US 11,645,679 B2
(45) Date of Patent: May 9, 2023

(54) AD EXCHANGE BID OPTIMIZATION WITH REINFORCEMENT LEARNING

(71) Applicant: Zeta Global Corp., New York, NY (US)

(72) Inventors: Danny Portman, Atlanta, GA (US); Zachary D Jones, Atlanta, GA (US); David Rose, Atlanta, GA (US)

(73) Assignee: Zeta Global Corp., New York, NY (US)

( * ) Notice: Subject to any disclaimer, the term of this patent is extended or adjusted under 35 U.S.C. 154(b) by 0 days.

(21) Appl. No.: 17/379,959

(22) Filed: Jul. 19, 2021

(65) Prior Publication Data

US 2022/0020065 A1  Jan. 20, 2022

Related U.S. Application Data

(60) Provisional application No. 63/053,705, filed on Jul. 19, 2020.

(51) Int. Cl.
| | | |
|---|---|---|
| *G06Q 30/02* | (2012.01) |
| *G06N 3/08* | (2006.01) |
| *G06N 3/04* | (2006.01) |
| *G06Q 30/0273* | (2023.01) |
| *G06N 3/084* | (2023.01) |
| *G06Q 30/0242* | (2023.01) |
| *G06Q 30/0241* | (2023.01) |
| *G06Q 30/0251* | (2023.01) |
| *G06Q 30/0204* | (2023.01) |

(52) U.S. Cl.
CPC ....... *G06Q 30/0275* (2013.01); *G06N 3/0454* (2013.01); *G06N 3/084* (2013.01); *G06Q 30/0246* (2013.01); *G06Q 30/0205* (2013.01); *G06Q 30/0249* (2013.01); *G06Q 30/0256* (2013.01); *G06Q 30/0276* (2013.01)

(58) Field of Classification Search
CPC ..................................................... G06Q 30/02
See application file for complete search history.

(56) References Cited

U.S. PATENT DOCUMENTS

| | | | |
|---|---|---|---|
| 2019/0303765 A1* | 10/2019 | Gou | G06N 3/0454 |
| 2021/0065250 A1* | 3/2021 | Basu | G06F 16/9038 |
| 2021/0357731 A1* | 11/2021 | Van de Wiele | G06N 3/006 |

OTHER PUBLICATIONS

Fedus, W., etal (2020). Revisiting Fundamentals of Experience Replay. <i>Proceedings of the 37th International Conference on Machine Learning</i>, in <i>Proceedings of Machine Learning Research</i> 119:3061-3071 available at https://proceedings.mlr.press/v119/fedus20a.html. (Year: 2020).*

* cited by examiner

*Primary Examiner* — Katherine Kolosowski-Gager
(74) *Attorney, Agent, or Firm* — Schwegman Lundberg & Woessner, P.A.

(57) ABSTRACT

A system for training a bidding model comprising: a plurality of tactics stored on at least one database; a plurality of hyperparameters; in response to an available inventory from a publisher relayed through a real time bid server, computing a bid on the available inventory; sending the bid to the real time bid server; receiving an auction result in response to the bid; calculating a plurality of rewards based on the auction result and the tactics; calculate a plurality of q values based on the rewards; calculate a plurality of losses; backpropogating the losses through the bidding model.

1 Claim, 13 Drawing Sheets

AD EXCHANGE BID OPTIMIZATION WITH REINFORCEMENT LEARNING

PRIORITY

This application claims the benefit from U.S. Provisional Patent Application 63/053,705, inventors Danny Portman et al. entitled Ad Exchange Bid Optimization with Reinforcement Learning which is incorporated by reference in its entirety and made a part thereof.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND OF THE INVENTION

This invention generally relates to using reinforcement learning to optimize real-time bidding systems for advertisement slots.

In the domain of programmatic advertising, demand-side platforms must decide how much to bid on advertising space in order to meet the goals set by clients. Existing bidding is done via established and rigid policies requiring human configuration and monitoring. Further, existing bidding is reactionary and delayed.

Existing bidding strategies are at times controlled by rigid automatic bidding policies. There is a need, therefore, for a real-time bidding with automatic discovery of bidding policies—flexible strategies which adapt.

BRIEF DESCRIPTION OF THE DRAWINGS

The subject matter disclosed herein is particularly pointed out and distinctly claimed in the claims at the conclusion of the specification. The foregoing and other objects

DETAILED DESCRIPTION

Described herein are embodiments of a multi-platform integration system with an adaptive automatic bidding system. A multi-platform integration system includes a computing system in communication with platforms, a database, and one or more user devices in a networked environment. The computing system hosts an application. The computing system configured to receive a first request from a user device to execute an instance of the application, transmit a graphical user interface (GUI) to the user device to be rendered on a display of the user device, and receive a second request, via the GUI, from the user device to deploy a digital advertisement. The second request includes a set of platforms, a set of settings, a set of parameters, and a set of allocation data. The computing system is further configured to interface with each one of the platforms in the set of platforms and integrate the digital advertisement directly with each one of the platforms in the set of platforms based on the set of settings, the set of parameters and the set of allocation data. The multi-platform integration system automates and streamlines the advertising trafficking process, resulting in less time trafficking advertising campaigns, fewer human errors and easy advertising budget and performance management. In addition, the Visto® UI (i.e., the GUI) renders the performance and allows users to spend across all the platforms in a single UI The multi-integration system provides operational efficiency, performance enhancement, and an enhanced system to maintain data integrity by reducing human error.

The system further provides for automated bidding on the available ad placement opportunities. The automated bidding ideally uses reinforcement learning to adjust the bidding strategies. As described herein, the adaptive automated bidding strategies evaluate multiple factors including webpage content, consumer interactions on the webpage, time of day, and response rate of placed ads, as a few of the many factors evaluated in bidding strategies. The deep learning eliminates the need for human oversight and configuration, allows for automatic discovery and implementation of sophisticated bidding policies, improves campaign performance by intelligently evaluating bid requests, automatically learns from historic bidding data—providing a warm start capability. Additionally, the more efficient bidding allows for decreased bandwidth in reaching the end consumers.

Figure 1:
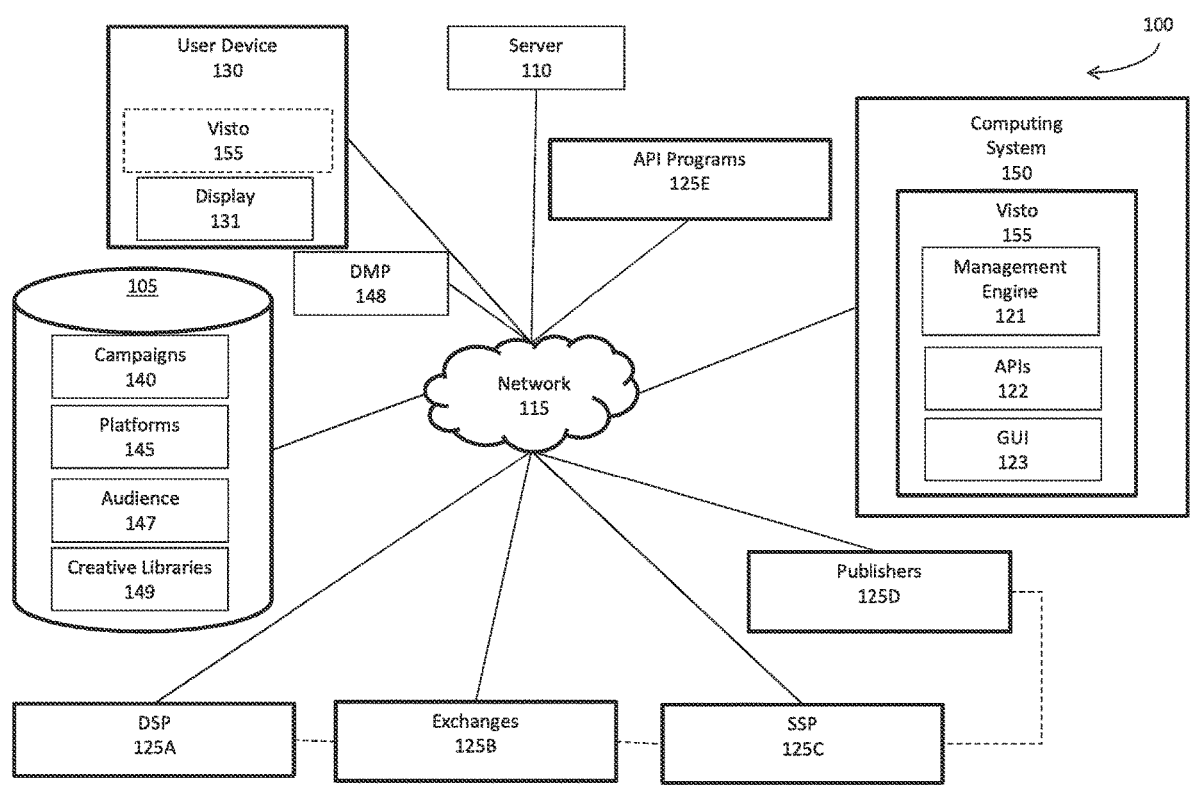
FIG. 1 is a block diagram illustrating a multi-platform integration system in accordance with an exemplary embodiment.
Figure 2A:
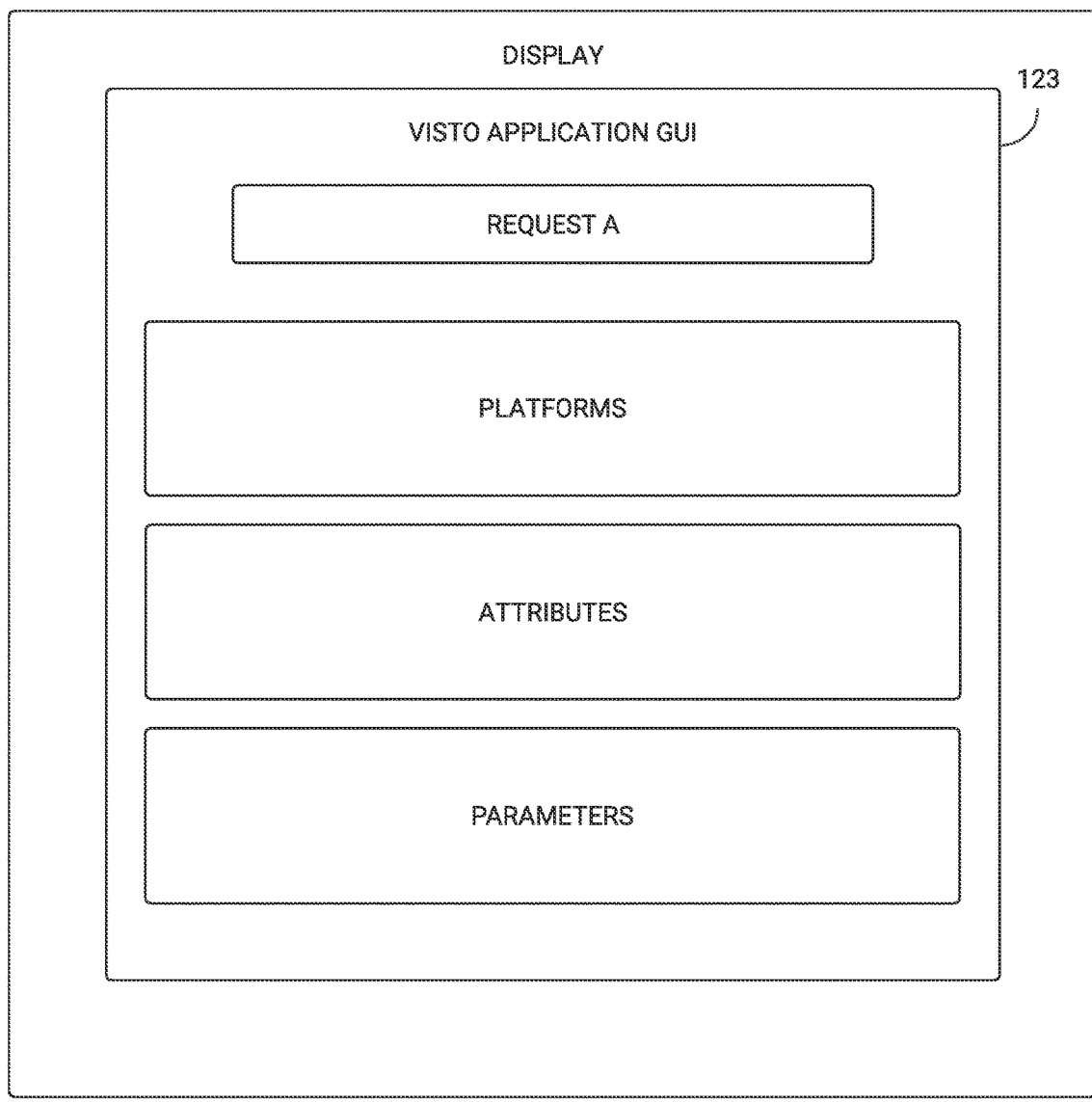
FIGS. 2A-D illustrate exemplary screens on a graphical user interface (GUI) for the multi-platform integration system.
Figure 2B:
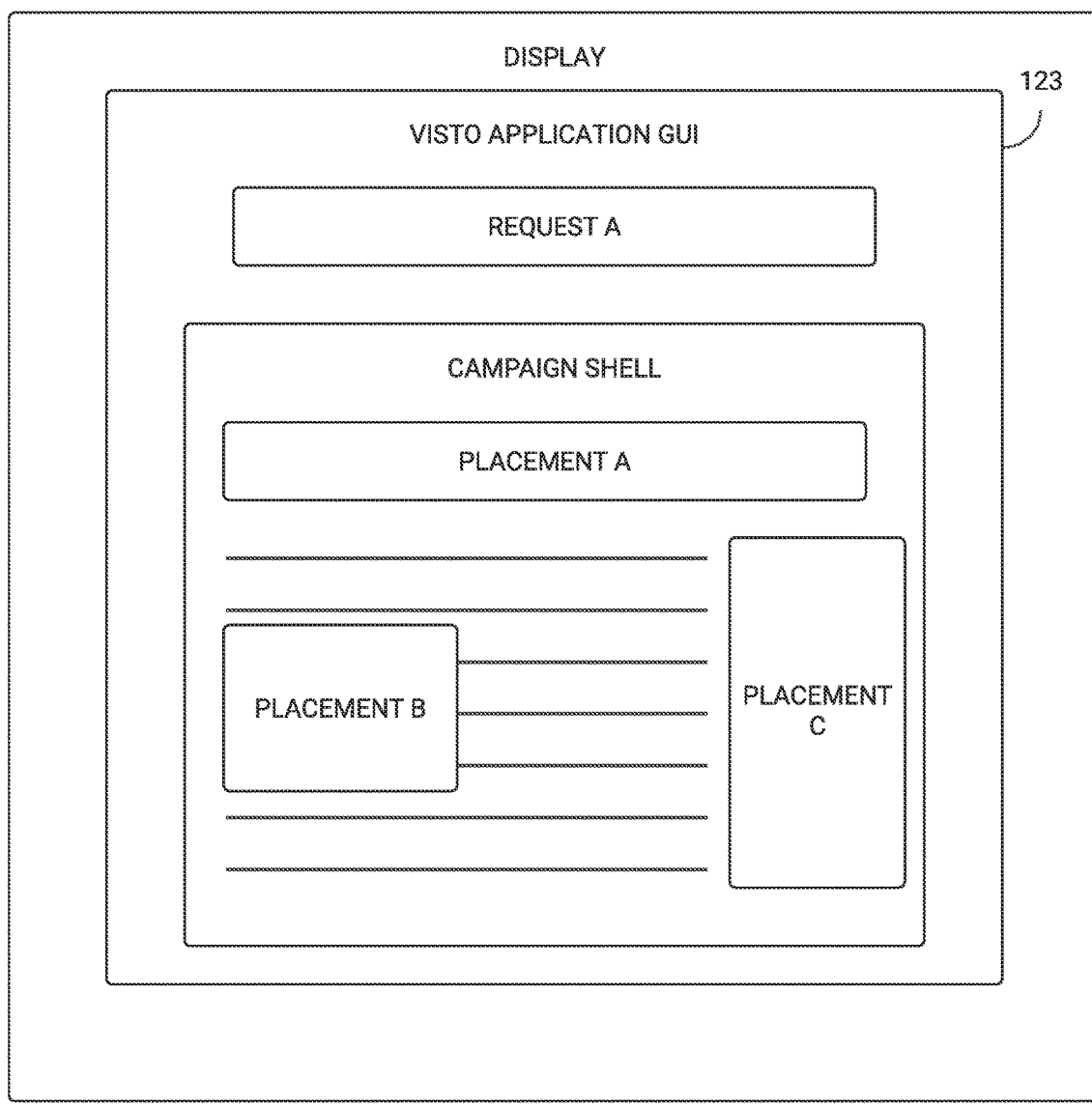
Figure 2C:
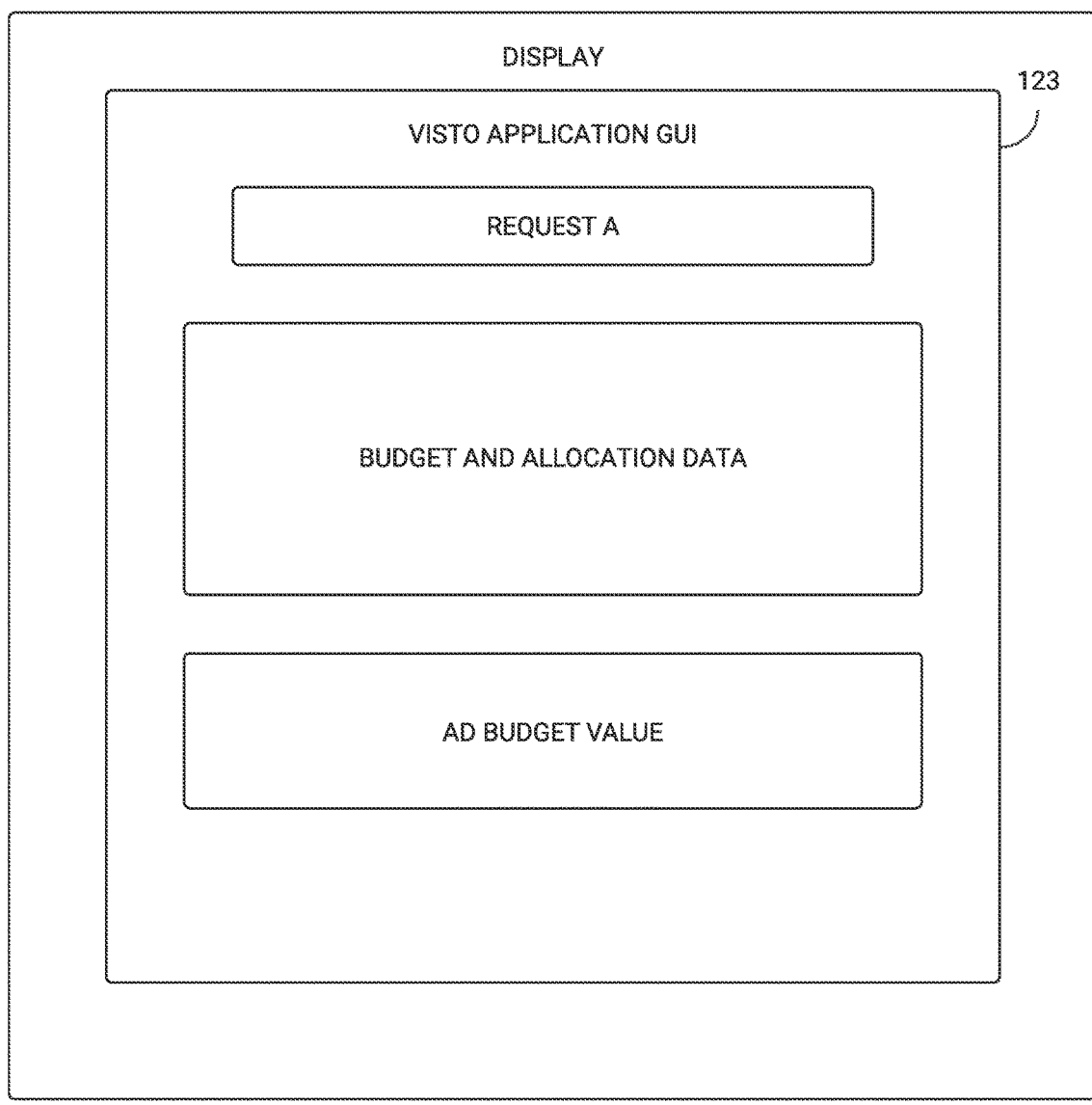
Figure 2D:
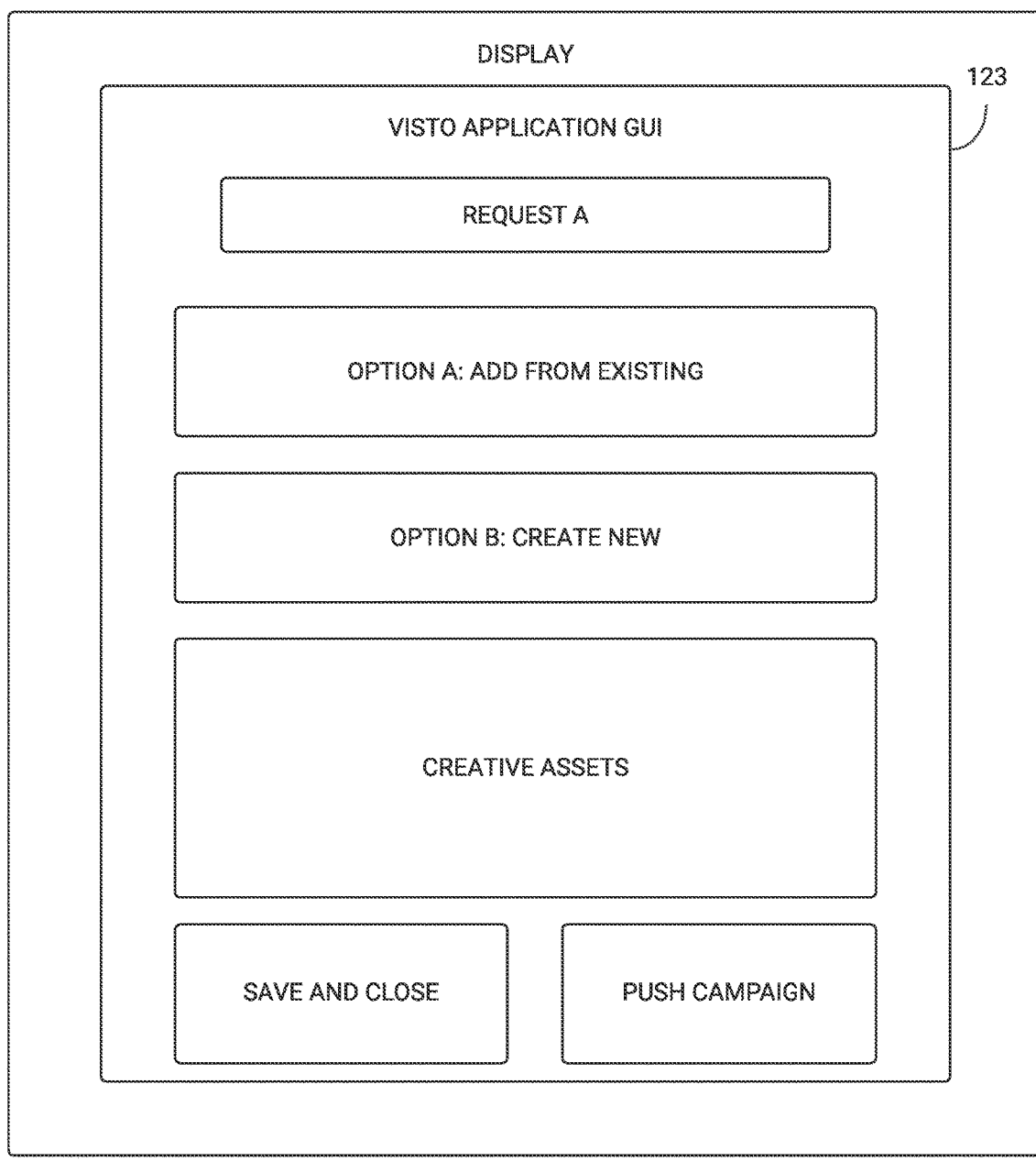

FIG. 1 is a block diagram illustrating a multi-platform integration system in accordance with an exemplary embodiment. The multi-platform integration system 100 can include one or more computing systems 150, one or more databases 105, one or more servers 110, one or more user computing devices 130, one or more Demand Side Platforms (DSP) 125A, one or more exchanges 125B, one or more Supply Side Platforms (SSP) 125C, one or more publishers 125D, one or more Application Program Interface (API) programs 125*e*, and a Data Management Platform (DMP) 148. In one exemplary embodiment, the computing system 150 can be in communication with the database(s) 105, user devices 130, the DSPs 125A, the exchanges 125B, the SSPs 125C, the publishers 125D, the API programs 125e, a Data Management Platform (DMP) 148, and the creative libraries database149, via a communications network 115. The computing system 150 can execute a Visto® application 155. The Visto® application 155 can include the management engine 121 and one or more Application Program Interfaces (APIs) 122. In one example, the management engine 121 can be embodied as a Multi-Platform Ad Management Tool (e.g., a Universal Remote). The computing system 150 can also implement an embodiment of the graphical user interface 123. The management engine 121 can implement the multi-platform integration system 100 using the one or more APIs 122. The Visto® application 155 can reside on one of the computing system 150 and can be accessible to the user device 130. For example, the user device 130 can execute a web browser or other application and can navigate to a universal resource locator (URL) associated with the Visto® application 155 on the computing system 150, and the user device 130 can interact with Visto® application 155 via the web browser. Alternatively, at least a portion of the Visto® application 155 can reside on the user device 130 or one of the servers 110.

In an example embodiment, one or more portions of the communications network 115, can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The computing system 150 may include one or more computers or processors configured to communicate with the database(s) 105, user devices 130, the DSPs 125A, the exchanges 125B, the SSPs 125C, the publishers 125D, the API programs 125e, and the DMP 148, via the network 115. The computing system 150 may host one or more applications, such as the Visto application 155, configured to interact with one or more components of the user devices 130, the DSPs 125A, the exchanges 125B, the SSPs 125C, the publishers 125D, the API programs 125e, the DMP 148, and/or facilitates access to the content of the databases 105. The databases 105 may store information/data, as described herein. For example, the databases 105 can include a campaigns database 140, platforms database 145, audience database 147, and a creative libraries database 149. The campaigns database 140 can store information associated with campaigns associated with digital data such as digital advertisements. The platforms database 145 can store information associated with platforms such as media buying platforms. The audience database 147 can include information associate with audience groups for digital advertisement targeting. The creative libraries database 149 can include information associated with creative assets for digital advertisements. The databases 105 can be located at one or more geographically distributed locations from each other or from the computing system 150. Alternatively, the databases 105 can be included within in the computing system 150.

In an exemplary embodiment, a user device 130 can execute the Visto® application 155 (e.g., as it resides on the user device 130 or via a web browser) to interface with the computing system 150. In response to executing the Visto® application 155, the computing system 150 can render the GUI 123 on the user device 130. The computing system 150 can receive input from user device 130, via GUI 123.

A user device 130 can transmit a request to integrate digital data along multiple different platforms, via the Visto® application 155, to the computing system 150. In response to receiving the request the computing system 150 can execute the management engine 121. As an example, the digital data can be a digital advertisement. The digital advertisement can be one or more of an image, video, gif, rich text, audio, or other type of digital data. The user can be an entity such as a company, advertiser, educational institution, marketing agency, or governmental institution. The user device 130 can receive a selection of platforms on which the user wishes to distribute the digital advertisement, via the GUI 123 of the Visto® application 155. The platforms can be media buying platforms such as a DSP platform 125A, SSP platform 125B, exchange 125C, publisher 125D, and API programs 125e. The management engine 121 can receive the selection of platforms, in response to the user device 130 receiving the selection of platforms, via the GUI 123 of the Visto® application 155.

The user device 130 can receive input associated with creating a campaign shell with designated lines, via the GUI 123 of the Visto® application 155. The lines can include placements associated with the campaign. The placements can include attributes such as screens, formats, and targeting. The user device 130 can receive input associated with assigning parameters for the digital advertisement in the Visto® application 155. The parameters can include ad format, screen types, Key Performance Indicators (KPI), etc. The parameters can define the way the advertisement will be delivered. The management engine 121 can receive the input associated with creating a campaign shell with designated lines and the assignment of parameters for the digital advertisement, in response to the user device 130 receiving the input, via the GUI 123 of the Visto® application 155.

The user device 130 can also receive input associated with budget and allocation information, via the GUI 123 of the Visto® application 155. The user device 130 can also receive input associated with a rate and rate type (i.e., type of currency), via the GUI 123 of the Visto® application 155. The rate can be billable cost charged to an advertiser. The user device 130 can also receive input associated with a selection between delivering the digital advertisement based on units or the budget, via the GUI 123 of the Visto® application 155. The management engine 121 can receive the selection of delivering the digital advertisement based on units or budget. In response to inputting a number of units of the digital advertisement a user desires to deliver, the management engine 121 can automatically calculate and render an Ad Budget value, on the GUI 123 of the Visto® application 155. Alternatively, or in addition to, in response to a user inputting an Ad Budget value, the management engine 121 can calculate and/or adjust the number of units of digital advertising to be delivered. The management engine 121 can render the number of units on the GUI 123 of the Visto® application 155.

The user device 130 can also receive input associated with targeting parameters, via the GUI 123 of the Visto® application 155, in order or refine where, when, and to whom the user would like the digital advertisement to be delivered. The user device 130 can also receive input associated with the following targeting parameters: audience, geography, daypart, sellers, and video, white/black lists.

The audience parameters can be information associated with targeting a focused audience using demographic, behavioral, purchase, search, interest, and other data categories. Audiences are selected from the available data sources such as the audience database 147. For example, the management engine 121 can retrieve the audiences from the audience database 147. The audience database 147 can retrieve audience information from a Data Management Platform (DMP) 148. The DMP 148 can be a centralized data management platform that allows you to create target audiences based on a combination of first-party and third-party audience data. The audience information can also be retrieved from a selected platform's proprietary segment list.

The geography parameter can include information associated with targeting advertisements based on geographic location. The targeting information can include or exclude geographic regions such as countries, states, metros/Designed Market Areas (DMAs), cities, and zip/postal codes, in which the user would or would not with to deliver digital advertisements. The daypart parameter can include information associated with delivering digital advertisements based on the days of the week or hours of the day. The user can select the specific days and times on which the user wishes to deliver the digital advertisement.

The sellers parameter can include information associated with targeting a digital advertisement including or excluding specific third party inventory sellers from open exchange buys. The user can specify the third party inventory sellers to include or exclude. The video parameter can include information associated with selecting the player size, position, and playback methods on which a digital advertisement will be running. The user can specify the player size, position, and/or playback methods. The white/blacklists parameter can include information associated with including or excluding specific domains or applications in order to control the inventory on which the digital advertisement can be displayed or run. The user can specify the domains or applications to include or exclude.

The management engine 121 can receive the input targeting parameters. It can be appreciated that the user can select one or more of the aforementioned targeting parameters. It can also be appreciated, that additional targeting parameters can be presented to the user.

The user device 130 can receive input associated with the creative assets of the digital advertisement, via the GUI 123 of the Visto® application 155. The creative assets can include promotional messaging for the user (i.e., advertiser and/or brand). The user can select from two different options to generate the creative assets, add from existing or create new.

In the event, the user device 130 receives input associated with a selection of add from existing, via the GUI 123 of the Visto® application 155, the management engine 121 can render a list of creative assets from a creative library on the GUI 123. As an example, the management engine 121 can retrieve a list of creative assets relevant to the user (i.e., advertiser and/or brand) from the creative libraries database 149. The management engine 121 can also render a chosen advertisement format. The management engine 121 can receive the selected creative assets and chose advertisement format based on input from the user device on the GUI 123 of the Visto® application 155.

In the event, the user device 130 receive input associated with a selection to create new, from the GUI 123 of the Visto® application 155, the management engine 121 can render an option to create a new creative asset on the GUI 123. The user device 130 can receive input associated with creating new creative asset, via the he GUI 123 of the Visto® application 155. Once a new creative asset is created, the management engine 121 can save the creative asset in a creative library associated with the specific user (user device 130) in the creative libraries database 149.

The management engine 121 can receive the selected creative assets previously created and/or a newly created creative asset. The management engine 121 can render a list of the selected creatives assets including the name, size, an ad server from which the creative asset is hosted (if applicable), and any Secure Sockets Layer (SSL) support on the GUI 123.

In response to completing the selections and input associated with the digital advertisement, the user device 130 can receive a selection to save and close, via the he GUI 123 of the Visto® application 155. The management engine 121 can receive the save and close selection, and save the selected and input information associated with the digital advertisement including selected platforms, parameters, targeting parameters, budget and allocation, and creative assets in the campaigns database 140. The user device 130 can receive a selection to push campaign, via the he GUI 123 of the Visto® application 155. In response to the management engine 121 receiving the selection to push campaign, the management engine 121 can deploy the digital advertisement to the selected platforms. The digital advertisement can be deployed based on the parameters, targeting parameters, budget and allocation, and creative assets. The management engine 121 can use the APIs 122 to interface and integrate the digital advertisement in each of the selected platforms. In response to deploying the digital advertisement, the management engine 121 can render delivery and performance information associated with the digital advertisement for each platform on the GUI 123. The user device 130 can receive input associated with adjustments in the budget and allocation information while the digital advertisement is deployed. In response to the user device 130, receiving a subsequent selection of push campaign, after adjusting the budget and allocation information, the management engine can dynamically reallocate the budget among each of the platforms based on the adjustments and distribute the reallocations to each of the platforms.

As described above, the platforms can be one or more of a DSP 125a, an exchange 125b, a SSP 125c, publishers 125d, and API programs 125e. A DSP 125a can enable buyers with direct real-time bidding access across multiple sources of digital advertisement inventory. The DSP 125a enables advertisers to purchase impressions (i.e., a view or an ad view), across publisher sites (i.e., publishers 125d), but targeted to specific users based on information such as their location and their previous browsing behavior. The management engine 121 can deploy the digital advertisement to a DSP 125a. The management engine 121 can purchase the impressions from publisher sites based on the parameters, targeting parameters, budget and allocation, and creative assets assigned by the user for the digital advertisement.

An exchange 125b can be an ad exchange. The exchange 125b can be used by advertisers (i.e., the user) to purchase advertisement space as well as by publishers to sell advertising space. The buying and selling can often be executed using real-time auctions. An exchange 125b can be a big pool of ad impressions. Publishers 125d can put their ad impressions into the pool. An advertiser (i.e., the user) can purchase the ad impressions. The purchases can be made in real time based on information such as the previous behavior of the user an ad is being served to, time of day, device type, ad position and more. The management engine 121 can deploy the digital advertisement directly to an exchange 125b such as an ad exchange. The management engine 121 can purchase ad impressions for the digital advertisements based on the parameters, targeting parameters, budget and allocation, and creative assets for the digital advertisement using the exchange 125b.

A SSP 125c can publishers 125d to sell their inventory to exchanges 125b and DSP 125a. The management engine 121 can deploy the digital advertisement directly to the SSP 125c. The management engine 121 can purchase a publisher's 125d inventory directly from the SSP 125c based on the parameters, targeting parameters, budget and allocation, and creative assets for the digital advertisement.

A publisher 125d can be an entity which publishes (i.e., displays or renders) the digital advertisement. The publisher 125d can be a website, domain, web application, or any other type of digital media. The publisher 125d can sell inventory such as ad impressions. Ad impressions can be views, view counts, and/or advertisement space. The management engine 121 can purchase impressions and deploy the digital advertisement directly to on specified publishers 125d. The management engine 121 can deploy the digital advertisement on the specified publishers 125d based on parameters, targeting parameters, budget and allocation, and creative assets for the digital advertisement. As a non-limiting example, the digital advertisement can be an image embedded with a hyperlink. The management engine 121 can embed the image of a specified size, with the embedded hyperlink on a publisher's website at a specified location on the website for a specified duration of time. The management engine 121 can indicate which geographic locations the digital advertisement is to be displayed.

An API program 125e can be custom tools developed enables advertisers and/or agencies (i.e., the user) to publish the digital advertisement with various publishers. As an example, various social media entities can have different API programs to publish the digital advertisements. The management engine 121 can deploy the digital advertisement directly to specified API programs 125e based on based on parameters, targeting parameters, budget and allocation, and creative assets for the digital advertisement.

In one embodiment, a digital advertisement can be deployed directly to a DSP 125a platform, to purchase ad space/impressions for the digital advertisement. The publishers 125d can interface with the SSP 125c to sell ad space/impressions. The DSP 125a and SSP 125b can interface with one another, via the exchange 125b.

FIGS. 2A-D illustrate exemplary screens on a graphical user interface (GUI) for the multi-platform integration system. As described above with respect to FIG. 1, the multi-platform integration system (e.g., multi-platform integration system 100 as shown in FIG. 1) can include a GUI (e.g., GUI 123 as shown in FIG. 1) rendered on a display (e.g., display 131 as shown in FIG. 1) of the user device (e.g., user device 130 as shown in FIG. 1) to facilitate deploying and integrating a digital advertisement on various platforms.

Figure 3:
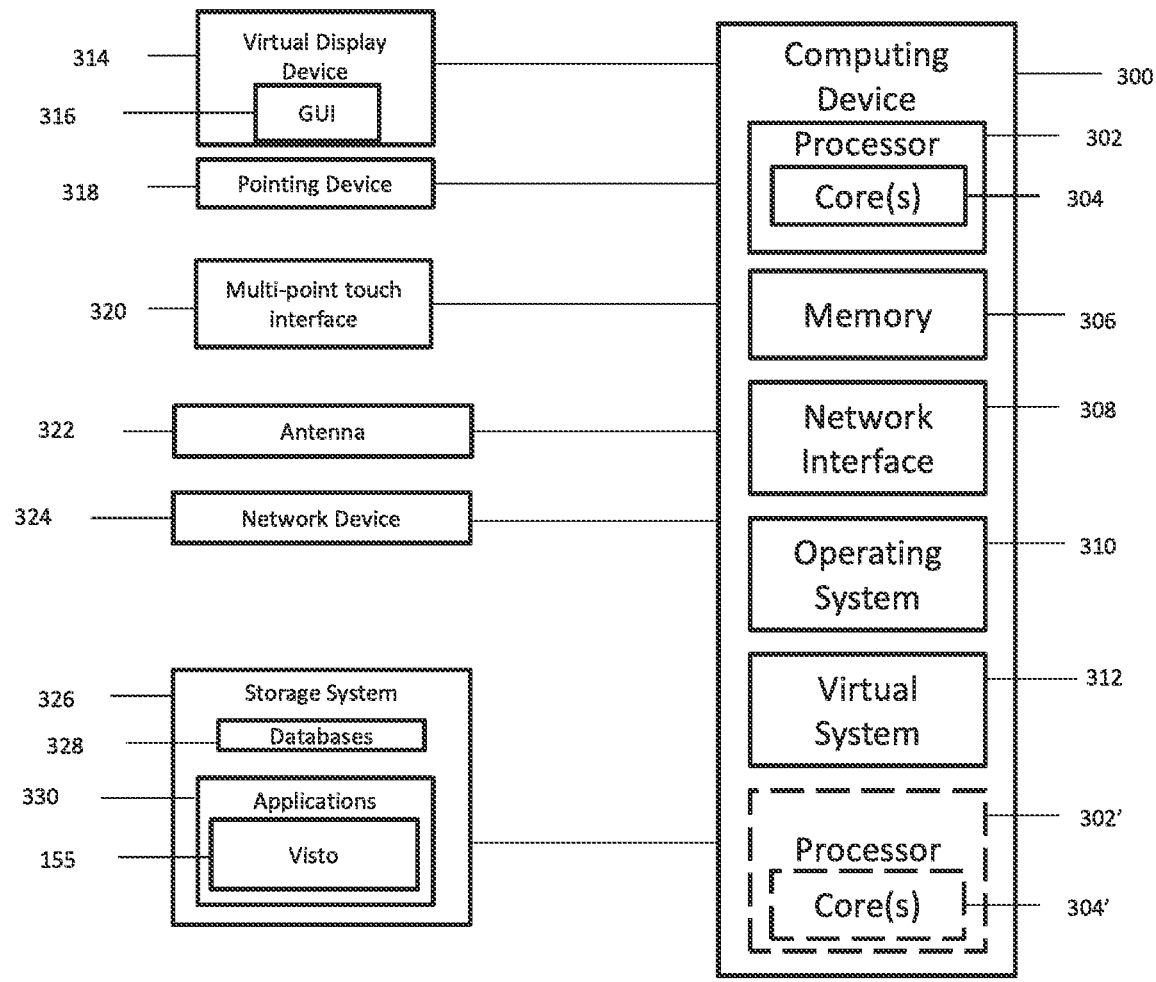
FIG. 3 illustrates a computing device in accordance with an exemplary embodiment.

FIG. 3 is a block diagram of an example computing device for implementing exemplary embodiments. The computing device 300 may be, but is not limited to, a smartphone, laptop, tablet, desktop computer, server or network appliance. The computing device 300 can be embodied as part of the computing system, user device, platforms (i.e., DSP, exchanges, SSP, publishers, APis), and the DMP. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the Visto® application 155 and management engine 121) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320, and a pointing device 318.

The computing device 300 may also include one or more storage devices 326, such as a hard-drive, CD-ROM, or other computer readable media, for storing data and computer-readable instructions and/or software that implement exemplary embodiments (e.g., applications i.e. the Visto® application 155). For example, exemplary storage device 326 can include one or more databases 328 for storing information regarding, campaigns, platforms, audiences, and creative libraries. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run operating system 310, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
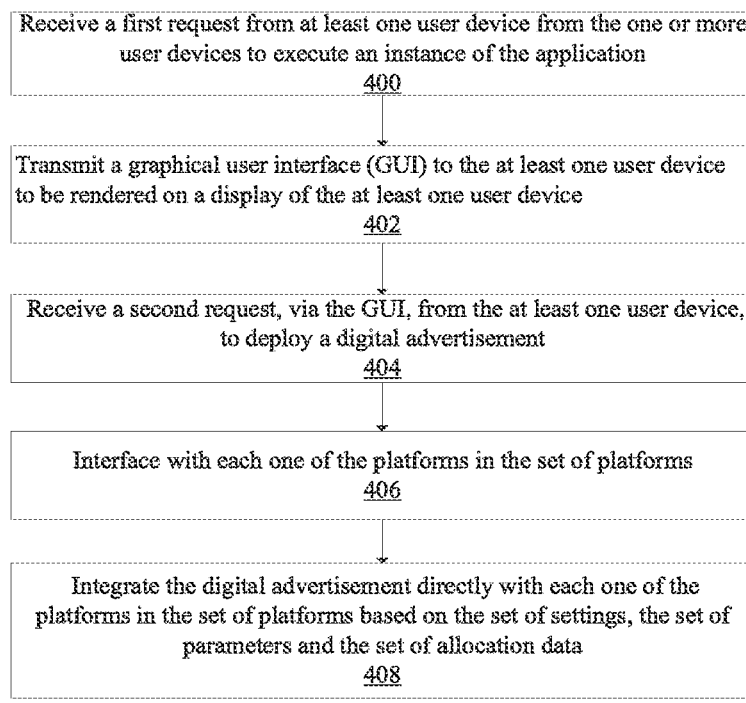
FIG. 4 is a flowchart illustrating an exemplary process performed by the multiplatform integration system according to an exemplary embodiment.

FIG. 4 is a flowchart illustrating an exemplary process performed in the multi-platform integration system. In operation 400, a computing system (i.e., computing system 150 as shown in FIG. 1) hosting an application (i.e., Visto® application 155 as shown in FIG. 1) and in communication with, a plurality of platforms (i.e., the DSP 125a, exchange 125b, SSP 125c, publishers 125d, and API programs 125e as shown in FIG. 1), a database (i.e., databases 105 as shown in FIG. 1), and one or more user devices (i.e., user devices 130 as shown in FIG. 1) in a networked environment, can receive a first request from at least one user device from the one or more user devices to execute an instance of the application. In operation 402, the computing system can transmit a graphical user interface (GUI) (i.e., GUI 123 as shown in FIG. 1) to the at least one user device to be rendered on a display of the at least one user device. In operation 404, the computing system can receive a second request, via the GUI, from the at least one user device, to deploy a digital advertisement. The second request includes a set of platforms of the plurality of platforms, a set of settings, a set of parameters, and a set of allocation data. In operation 406, the computing system can interface with each one of the platforms in the set of platforms. In operation 408, the computing system can integrate the digital advertisement directly with each one of the platforms in the set of platforms based on the set of settings, the set of parameters and the set of allocation data.

Figure 5:
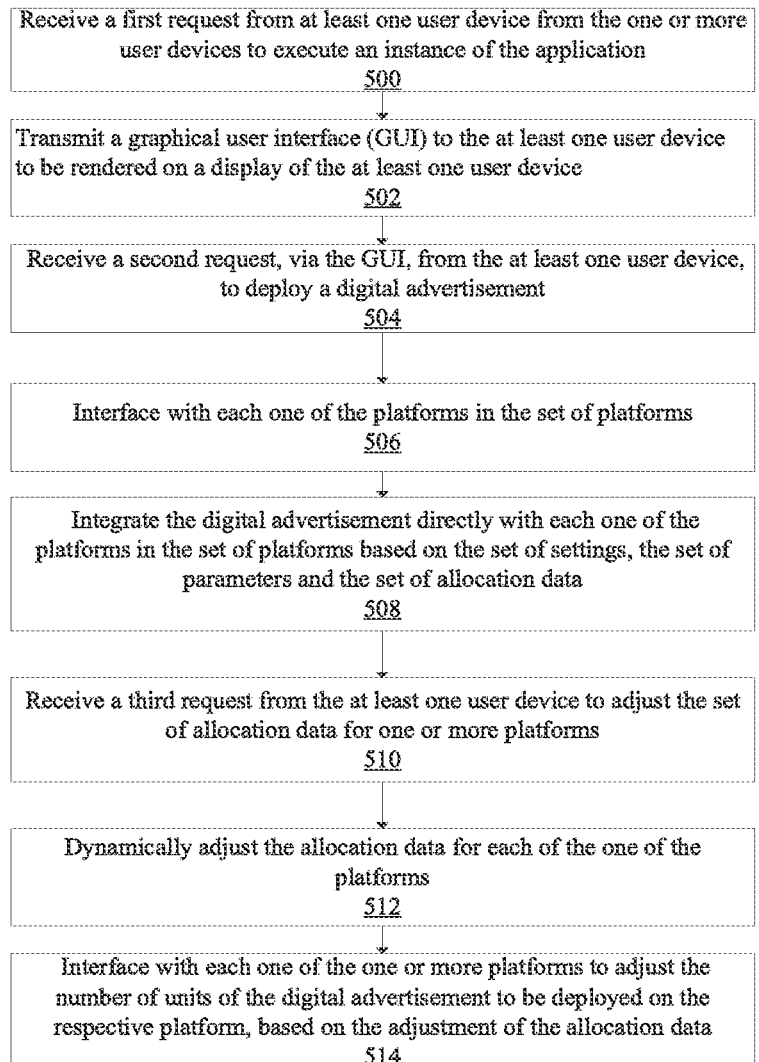
FIG. 5 is a flowchart illustrating an exemplary process performed the multi-platform integration system according to an exemplary embodiment.

FIG. 5 is a flowchart illustrating an exemplary process performed in a system for detecting unsecured sensors in a network. In operation 500, a computing system (i.e., computing system 150 as shown in FIG. 1) hosting an application (i.e., Visto® application 155 as shown in FIG. 1) and in communication with, a plurality of platforms (i.e., the DSP 125a, exchange 125b, SSP 125c, publishers 125d, and API programs 125e as shown in FIG. 1), a database (i.e., databases 105 as shown in FIG. 1), and one or more user devices (i.e., user devices 130 as shown in FIG. 1) in a networked environment, can receive a first request from at least one user device from the one or more user devices to execute an instance of the application. In operation 502, the computing system can transmit a graphical user interface (GUI) (i.e., GUI 123 as shown in FIG. 1) to the at least one user device to be rendered on a display of the at least one user device. In operation 504, the computing system can receive a second request, via the GUI, from the at least one user device, to deploy a digital advertisement. The second request includes a set of platforms of the plurality of platforms, a set of settings, a set of parameters, and a set of allocation data. In operation 506, the computing system can interface with each one of the platforms in the set of platforms. In operation 508, the computing system can integrate the digital advertisement directly with each one of the platforms in the set of platforms based on the set of settings, the set of parameters and the set of allocation data. The allocation data is associated with a number of units of the digital advertisement to be deployed to each platform in the set of platforms. In operation 510 the computing system can receive a third request from the at least one user device to adjust the set of allocation data for one or more platforms of the set of platforms on which the digital advertisement has been integrated, after the digital advertisement is integrated with each one of the platforms of the set of platforms. In operation 512, the computing system can dynamically adjust the allocation data for each of the one of the platforms. In operation 514, the computing system can interface with each one of the one or more platforms to adjust the number of units of the digital advertisement to be deployed on the respective platform, based on the adjustment of the allocation data.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present invention. Further still, other aspects, functions and advantages such as different combinations of the described embodiments are also within the scope of the present invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

In some ideal embodiments, there is real-time advertisement bidding for advertisement slots. A television station server (TSS) is communicatively connected to a network. The network may be any combination of wired and/wireless networks including, but not limited to, a local area network, a wide area network (WAN), a metropolitan area network (MAN), the Internet, and the like. One or more advertisement service databases (ASDs). Each ASD is configured to maintain video advertisements and metadata respective of the video advertisements that allow for placement of a video advertisement contained in an advertisement slot within a video stream broadcast by the TSS based on the winning bid.

A real-time bidding system (RTBS) is also communicatively connected to the network. The RTBS is configured to handle bidding requests and placements of advertisements in available inventory as further described herein. It should be appreciated that the available inventory may be on television or video advertising slots for video advertisements, online webpage inventory, email inventory, and any other known or newly discovered advertising inventory placement. A database communicatively connected to the RTBS either directly or indirectly (i.e., through the network), contains information for the use of the RTBS respective of, for example, agency bidding rules, historical information, viewer (ratings) data, program data, and so on. Such information may be further provided by external sources. The bidding rules are defined by the advertisement agencies according to campaigns' preferences. In an embodiment, the RTBS is configured with a set of application programming interfaces (APIs, not shown) that enable advertisement agencies to enter new bidding rules and/or to modify existing rules.

In some ideal embodiments, the RTBS also received information about the viewer of the available inventory and/or information about the content surrounding the available inventory. The information about the content surrounding the available inventory may include meta data, subject matter, sentiment, image percentage, traffic and demographics, amount of text or images, proportion and location of the available inventory, and any other known information about the available inventory's surrounding content including quantity of additional inventory and placement in proximity to the other available inventory. It should be appreciated that this may include a URL or information parsed from a javascript program to parse the content on a website with available inventory.

In embodiments passing viewer or end consumer information, the RTBS may receive information in the collective or for each individual available viewer/end consumer. It should be appreciated that the system may pass information to the RTBS indicating the demographic breakdown of their viewers such as what percentage of the viewers are various age, income, gender, location, etc. Alternatively, the system may pass individual inventory viewing placements for a specific segment or demographic. For example, the system may break the available inventory into multiple bid opportunities such as a placement on a given website for viewers who are male and between 18 and 40 with a separate opportunity for the same placement on the website for viewers who are female between 18 and 40.

Program information for TTS inventory may include, for example, genre, actors, etc., and may be received from external sources such as Rovi. The viewer data may be based on Nielsen ratings and may include ratings/share and total viewers, demographics (e.g., age, gender, race, economic class, and geographical location) of potential viewers, and the like. In one embodiment, each rule includes one or more sub-rules defining a different price range for a different set of criteria.

It should be understood that different types of information may be included as enriched data to inform the RTBS including demographics, consumer browser information, past consumer browsing history, past consumer transaction history, consumer geolocation, consumer interests, consumer past conversions, and the like. In some of these embodiments, the RTBS receives a unique user identifier or means to match the consumer information to a unique consumer identifier in a consumer data store.

It should be understood that inventory slots may be segmented in any number of ways including known demographics and also based on unique consumer ids or consumer demographics selected or collated from a consumer data store.

In some embodiments, the TSS is configured to send, over the network, to the RTBS a request for placement of a video advertisement (also referred to as a video ad, or in short, an ad). Such a request is provided at a predetermined period such as, for example, 5 seconds prior to the placement of the video advertisement within the video stream broadcast by the TSS. The request sent to the RTBS includes the time of the broadcast of the video advertisement and the television station making the request, and may further include additional parameters, such as the maximum and/or minimum length of the video advertisement, the category of the program when the video advertisement is to be inserted, demographics of the station, and other relevant information.

Responsive of the request received, the RTBS is configured to check the request with respect to the information available in the database, and in particular the bidding rules, to determine the winner of the bid for placement of a video advertisement. The RTBS is further configured to inform the TSS and/or an OTT content provider (not shown) of the winning bidder and provides metadata respective of the winning video advertisement.

In one embodiment, the streaming of the video advertisement is provided in real-time from the ASD associated with the agency that provided the winning bid. In another embodiment, the winning video advertisement may already be located in a database (not shown) communicatively connected to the TSS and broadcasting may be provided therefrom.

It should be noted that the TSS may be operated by the broadcast television network (e.g., CBS, NBS, CNN, and the like, and/or a local or regional station such as, e.g., New-York FOX 5, and/or cable and satellite television companies). The RTBS provides means for bidding for advertisement slots by broadcasters providing video streams via the different types of TSS.

In another embodiment, the broadcaster is an OTT content provider. Such providers may utilize streaming servers (e.g., a streaming server) to stream media content to user devices. A user device may be, but is not limited to, a smartphone, a PC, a tablet computer, a smart TV, and the like. Typically, the streaming servers of OTT content providers are connected to content distribution networks (CDNs).

According to an embodiment, an OTT content provider can send a bidding request to the RTBS for placing an advertisement in a slot with the streamed content. The bidding request is processed as discussed herein to find the best bidder (agency) for the slot. In this embodiment, the advertisement to be placed may be provided from a database, which may be one of the ASDs, and the advertisement can be streamed directly to user devices.

In some embodiments, a request for a real-time bid on a time slot for a video advertisement is received by the RTBS from a broadcaster (e.g., a TSS or a server). Such a request may be issued by the TSS when, for example, there is an available time slot for broadcasting a video advertisement. The real-time bid request may be made for the same time slot at different locations. In an embodiment, the bid request is received immediately prior to a timing of the advertisement slot in a broadcast content, for example, 5 seconds before the slot is available. The bid request is rule-based.

It should be understood that an RTBS may receive requests from a broadcaster, from a different type of publisher (such as a web publisher), or a combination of a number of types of publishers for a mix of available inventory types.

In some embodiments, it is checked if any bidding rules can potentially match the real-time bid request received. A bidding rule defines a set of criteria for the bid and typically associated with a score if the rule is satisfied. The rule's criteria may include, but are not limited to, time, a publisher location, a TV channel broadcasting of a desired spot or type of surrounding content, program information respective of a TV show programmed during the desired spot, viewer or consumer data, information regarding advertisements that have already been served or amount of surrounding advertising placements, a price range that an agency is willing to pay at each point, and so on.

A bid score is computed for each matching bid for each agency. A bid is matching when the criteria of one or more rules of agency satisfy the bid request. The bid score is computed by factoring the scores from the matching one or more rules. For example, a bidding rule is defined with the following criteria <ESPN2, adults over 30 years old, Sundays, prime-time> and a score of '10'. A bid request is a slot on an ESPN2 show broadcasted on Sunday at 8 pm. The demographic group as determined, for example, from data gathered by Nielsen, is adults over 30 years old, then the rule is satisfied and the score associated with the rule is factored when computer or otherwise providing the matching bid.

A winning bid among the matching bids computed by the agencies is selected. The selection is based, in part, on the computed bid scores. As noted above, the rules are provided by the different advertisement agencies, therefore the winning bid is the bid by the agency that matched the most rules of the bid request issued by the broadcaster.

In an embodiment, the highest scoring, and hence the best matching, is the winning bid for an advertisement agency. In an exemplary embodiment, in the case where multiple bids have an equal highest score, then the selected bid is that which has the lowest cost bid to the advertisement agency.

According to various embodiments, different bidding strategies may be utilized to select the winning bid. Such strategies include, but are not limited to, a price increase as time gets closer to airing a potential advertisement, a price decrease as time gets closer to airing a potential advertisement, a combination thereof, or any other strategy, that may be determined based on at least one of historical data respective of the broadcaster, the time slots, the viewer data, programming information, and so on.

The strategy may also determine a limited number of bidders (agencies) to remain in the race for placement of an advertisement by bidding head to head, for example in a round robin fashion. A strategy may be employed to prevent overcrowding of a single advertisement from appearing too frequently, or requiring a higher price if such reoccurrence occurs.

In another embodiment, a bid that is below a minimum requirement may not be accepted even if it is the highest bid; or, a bid that is the highest may not be accepted if it is below a minimum length or above a maximum length; and so on. The bid selection process in one embodiment is based on a total score computed upon receiving bid request. As noted earlier, a score, and hence the total score, may be viewed as the offer is made to the requested bid.

Based on the winning bid, the advertisement source database (e.g., an ASD) of the winning agency is queried to provide a video advertisement in the slot on which the bid was made on. It is checked whether there is still time to send the response to the TSS for placing of the video advertisement in the right video advertisement slot (i.e., if the slot has not been elapsed). If not execution terminates; otherwise, execution continues with where the video advertisement or links thereto are provided to the TSS for processing.

In an embodiment, the bidding processes implemented by the RTBS and performed by the processing unit involve receiving bid requests from broadcasters (such as the TSS) and comparing the requests with data from third party services and submitted bids; and responding with the best matching bid. Hence the RTBS is configured so as to receive from a broadcasting station such as, for example, the RTBS, a request for placement of bids accompanied by various metadata.

Based on the request, the RTBS is configured to perform the bidding in order to timely provide a selection of an advertisement that meets the criteria for placement as an advertisement in the video stream of that broadcasting station. The RTBS may apply different bidding strategies, such as those discussed above. The RTBS may be further configured to determine a time for the end of the bidding that is sufficient to upload an advertisement if it is not available in-line at the broadcasting station.

In some exemplary implementations, the RTBS comprises a scoring engine (SE), a bid comparison engine (BCE), a bid response engine (BRE), an agency bidding interface (ABI), and a data storage, that are communicatively connected through a bus for exchange of data and information as may be required.

In one embodiment, the data storage is used for storing and retrieving of data stored therein by any one of the scoring engine, the bid comparison engine, and the bid response engine. In an embodiment, the data storage includes the bidding rules defined by the advertisement agencies and data received from external sources, such as those defined above.

The agency bidding interface allows for external communication of the RTBS. In an embodiment, the interface allows receiving bidding rules set by the advertisement agencies and information from the external sources. In some exemplary implementations, the agency bidding interface exposes a set of application programming interfaces (APIs) to the various advertisement agencies.

The agency bidding interface may, in one embodiment, be rule based, where the rules are predefined or defined in real-time based on needs of agencies, the services provided, and/or the broadcasting station.

The scoring engine is configured to receive incoming bidding requests from at least one broadcaster. Each such bidding request for an advertisement slot in a televised or streamed content is provided by the broadcaster. A bidding request for a slot is received immediately prior to the timing of the slot in the televised or streamed content, thereby providing a real-time bidding request. In an embodiment, the bidding request may receive a minimum score, i.e., the minimum offer that the TSS would accept for "acquiring" the data slot.

The scoring engine is further configured to match each received request to the plurality of bidding rules saved in the storage and to compute a total score for the bid request for each advertisement agency. The score for each bid request for an advertisement agency is computed if the bidding rules defined by the advertisement agency satisfy the bid request. The score of the incoming request for each agency represents an offer to the agency to the request.

As an example, a bid request can be matched against bidding rules of advertisement agencies AG1, AG2, AG3, AG4, and AG5 having scores 10, 8, 4, 0, and 8, respectively. It is determined that the rules set by AG4 do not match the request. In an exemplary embodiment, in the case where multiple bids have an equal highest score (e.g., from AG2 and AG5 in the above example), then the selected bid is that which has the lowest cost bid to the advertisement agency.

The bid comparison engine is configured to receive the bids, i.e., computed scores for the advertisement agencies that have at least one matching bid received, and to select the bid which provides the highest offer among the various advertisement agencies for submission. Such selection, in one embodiment, may be based on bidding strategies discussed in detail above.

The bid response engine is then tasked with the responsibility to timely notify and place the selected bid with a relevant broadcaster, i.e., the broadcaster that has initiated the process for the respective receipt of bids on an advertisement slot in a broadcast television stream.

It should be appreciated that the available advertisement slots are any available in programmatic ad exchanges and can include television, webpages, email, and any other like opportunity.

Ideally, the bidding rules are adapted using reinforcement learning.

In some of these ideal embodiments, as illustrated herein, a function to apply models is input a model, bid requests, model scores, and tactic. The tactic may be an item for which the system is bidding an encoded request and the policy may be a probability distribution over bids return policy.

In some of these ideal embodiments, real-time bidding is optimized with reinforcement learning models using deep neural networks. The bid request and scores are input from models which include data on the return on investment of previous ad placements including click, conversion, view, etc. before being sent to the bid server. The model outputs a probability distribution over actions and an estimate of value.

Figure 6:
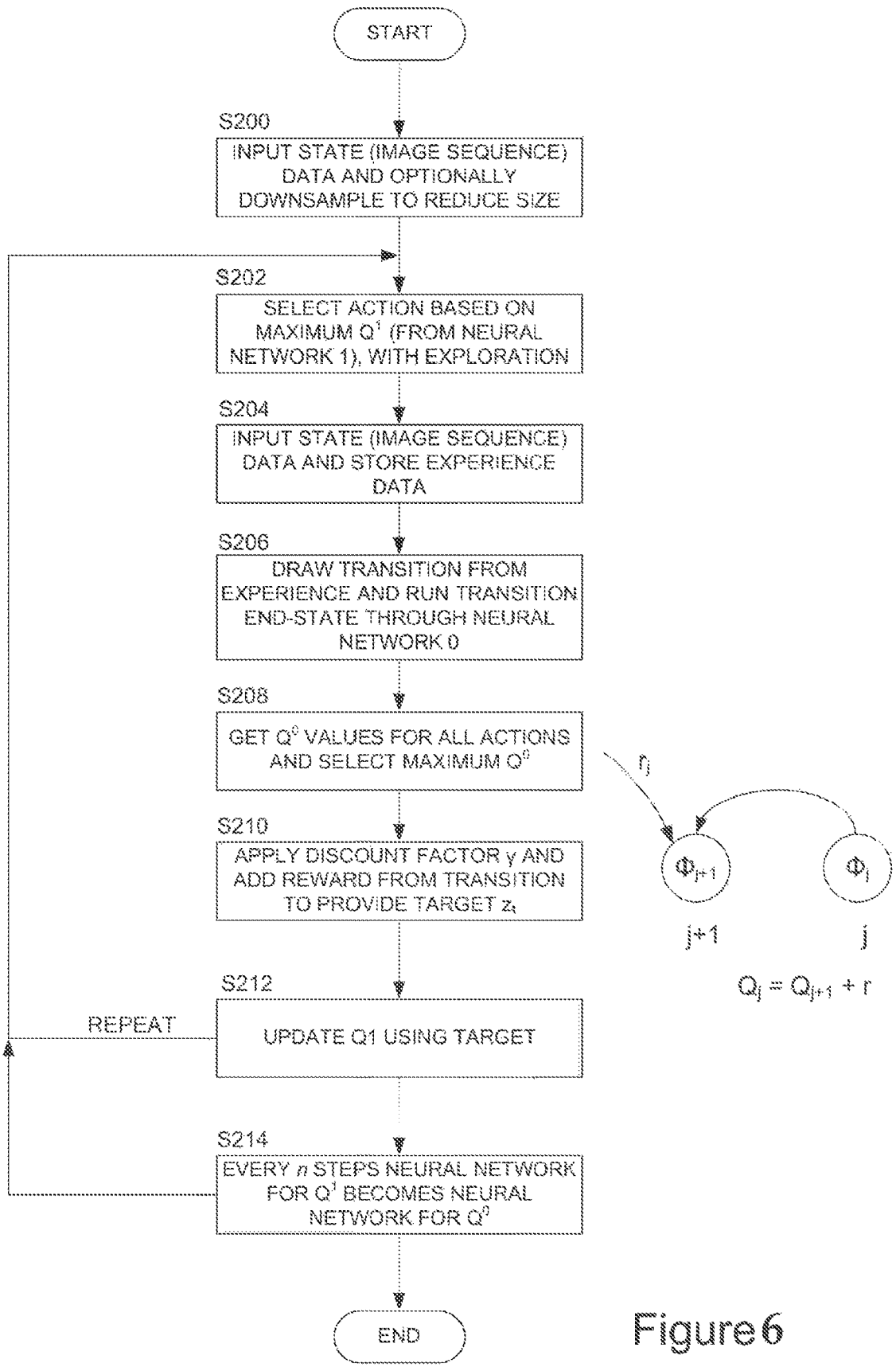
FIG. 6 shows flow diagram of deep Q-learning procedure with experience replay according to an embodiment of the invention

FIG. 6 illustrates a procedure for reinforcement learning using a deep neural network to estimate Q-values, according to some embodiments of the invention. This procedure ideally trains the bidders. The procedure begins by inputting state data from a controlled system (S200). For the test system of a DSP/SSP, this comprised a of sequence bids, results from the bidding, and response rate for subsequent ad placements. One of the advantages of the approach we describe is that the procedure is able to determine the most efficient ad placement timing and optimizing bidding to ensure that ad placement bidding is optimized for time, amount of bid.

The procedure employs first and second neural networks (neural networks 0 and 1), each of which ends up being trained through implementation of the procedure to provide action-value parameters, more particularly Q-values, for each action or each definable input state. Thus at step S202 the procedure employs the second neural network (neural network 1) to provide, for the input state, a set of Q-values, one for each possible action at that state ($Q^1$-values). The procedure selects the maximum Q-value (maximum expected reward), but also employs an exploration strategy, in embodiments an ε-greedy strategy (selecting a random action ε of the time). The skilled person will appreciate, however, that many types of exploration strategy may alternatively be employed—for example a soft-max strategy based on, say, a Gibbs or Boltzmann distribution; or a variant of ε-greedy exploration may be employed in which c decreases over time.

The procedure then again inputs state (ad placement bid) data and stores experience data (S204). The stored experience data comprises the before and after states, the action taken, and the reward earned. At step S206, the procedure draws a transition from the stored experience data, either randomly or according to a prioritized strategy, and provides the end, 'after' state of the transition to the first neural network (neural network 0). The first neural network is employed to determine the maximum Q-value for this end state (step S208), by providing a Q-value ($Q^0$-value) for each action so that the maximum can be selected. Then, at step S210 the procedure applies a discount factor, γ, to the maximum Q-value from step S208, and adds the reward from the transition to this end state, to provide a target Q-value ($y_j$ in the algorithm below). In this described embodiment the reward is stored with the experience data (for the test systems the reward was defined by a numerical output from the emulator), but it may be provided in some other manner for example as part of the definition of a control problem (say by defining a target region of state space to be within, or to avoid). The logic behind adding the reward is illustrated to the right of step S210—the Q-value output from neural network 0 takes into account the reward which has by that stage been received and thus it is by then no longer expected.

The target Q-value ($y_j$) is used to train the second neural network (neural network 1), to update the $Q^1$-values. Conveniently the training may be implemented using stochastic gradient descent, for example using back-propagation, optionally employing an adjustable or adaptive learning rate to decrease the step size over time (that is, the step size used to adjust the weights). Optionally, as the skilled person will appreciate, the gradients may be accumulated over a plurality of transitions drawn from the stored experience data, in a minibatch approach. The skilled person will recognize that, rather than a neural network being trained on its own output, the output of the first neural network is used to train the second neural network.

The procedure then ideally loops back from step S212 to step S202 to select a further action. In embodiments the size of the experience data store is limited and therefore, as new experience data is stored, older experience data may be discarded, for example using a FIFO (first in first out) strategy. After a defined number of training steps, for example every $10^2$, $10^3$, or $10^4$ steps, the weights from the second, trained neural network are copied across to the first neural network (S214) so that, in effect, the neural network for the $Q^1$-values becomes the neural network for the $Q^0$-values, and the training of the second neural network proceeds. The training procedure may continue indefinitely or, in other approaches, the training may be terminated, for example after a predetermined number of training steps and/or based on a training metric such as an average predicted state-value function for a defined set of states.

As described the procedure operates online or quasi-online (the latter if minibatch training is employed). However the skilled person will appreciate that in alternative embodiments the procedure may accumulate stored experience data in one phase and then train the second neural network using the stored experience data in a second phase.

An example algorithm for deep Q-learning with experience replay is shown below. In order to improve the stability of the algorithm we decouple the network used to generate the targets $y_j$ from the network being trained. More precisely, a copy of the Q network being trained is made after every L parameter updates and used to generate the targets $y_j$ for the next L training updates. This procedure improves stability of the training algorithm because the network used to generate the targets changes only every L updates, which prevents feedback loops from occurring in which predictions grow uncontrollably.

In the example algorithms above the procedure runs over M ad bid sequences where the ad bids are submitted to the data server for a number of ad placements, the data server determines which bid is awarded the ad placement, and, after the ad is placed in the ad placement, the response rate of the ad in the ad placement. The ad placements can vary by platform, page content, time of day, and any other pertinent metric. Bids may be initialized with random numbers. It will be appreciated that in other implementations other ad placement metrics may be defined, or the procedure may be run continuously. In the illustrated example the algorithm runs for all the frames captured whilst the system is playing a game.

In the above algorithms preprocessed sequence data defining an input state is denoted $\varphi_i$ where i labels the state.

In the above examples the algorithms learn off-policy—that is the actions selected to train the second neural network are different to those indicated by the first neural network used for bidding on ad placements—that is embodiments of the procedure learn and bid on ad placements.

In principle embodiments of the procedure may be operated without storing the results of the actions selected by the second neural network in the experience data store: the stored experience may be derived from some other source, for example by observing some other entity interacting with the system. All that is required is to be able to observe multiple transitions each comprising an initial state, an action, and a final state and, optionally, a reward (or cost). The stored experience may then still be used to update the first neural network, which in turn generates targets for training the second neural network. In practice it is convenient to store the experience of actions selected by the second neural network so that the first neural network can draw from these later, thus providing a self-contained system, but this is not essential.

In the above algorithms we store the agent's experiences at each time-step, $e_t=(s_t, a_t, r_t, s_{t+1})$ in a data-set $D=e_1, \ldots, e_N$, pooled over many bid sequences into a replay memory. During the inner loop of the algorithm, Q-learning updates, or minibatch updates, are applied to samples of experience, drawn at random from the pool of stored samples. After performing experience replay, the agent selects and executes an action according to an ϲ-greedy policy (where $0 \leq \varepsilon \leq 1$ and may change over time). Since using histories of arbitrary length as inputs to a neural network can be difficult, the Q-function instead works on fixed length representation of histories produced by a function $\varphi$.

The approach of the algorithms we describe has several advantages. There are no interactions, each step of experience is potentially used in many weight updates, which allows for greater data efficiency. Second, learning directly from consecutive samples is inefficient due to the strong correlations between the samples, but randomizing the samples breaks these correlations and therefore reduces the variance of the updates. Third, when learning on-policy the current parameters determine the next data sample that the parameters are trained on. For example, if the maximizing action is to move left then the training samples will be dominated by samples from the left-hand side; if the maximizing action then switches to the right then the training distribution will also switch. It is easy to see how unwanted feedback loops may arise and the parameters could get stuck in a poor local minimum, or even diverge catastrophically. By contrast, in the technique we describe the behavior distribution is averaged over many of its previous states, smoothing out learning and helping to avoid oscillations or divergence in the parameters. When learning by experience replay, leaning is off-policy because the current parameters are different to those used to generate the sample, which motivates the choice of Q-learning.

In some embodiments the algorithm only stores the last N experience tuples in the replay memory, and samples uniformly at random from D when performing updates. However this approach is limited since the memory buffer does not differentiate important transitions and overwrites with recent transitions due to the finite memory size N. Similarly, the uniform sampling gives equal importance to all transitions in the replay memory. In other embodiments, therefore, a more sophisticated sampling strategy may be employed, for example to emphasize transitions from which the procedure can learn the most.

While the reinforcement learning framework described above uses complete sequences $s=s_1, a_1, \ldots, s_t, a_t$ as the state representation this is challenging in practice, typically requiring a recurrent neural network architecture that can back propagate errors over thousands of time-steps. Thus, instead, embodiments of the technique use a short history of winning bids and response rate for ad placements, for example 4 frames, as a pre-processing step.

As previously mentioned, in embodiments the training loop of the algorithm samples a minibatch of transitions and performs minibatch gradient descent update on the given objective. A variant uses the RMSProp which adaptively determines a learning rate for each weight. This leads to faster training on some problems.

It should be appreciated that in some embodiments, the models are pretrained offline. In these embodiments, the untrained model is initialized, a replay buffer is loaded. For each experience in the replay buffer, models are applied to the bid request. That is, an estimated policy is derived from an application of the given model with parameters including the model, the request, scores, and a tactic. A reward tactic, as indicated further herein, computes a reward with parameters tactic and result. A value loss is estimated from the difference between the estimated value and the reward which is backpropagated through the model. The training then descends the gradient. After running through all the models, the training is ideally saved to a disk.

Figure 7A:
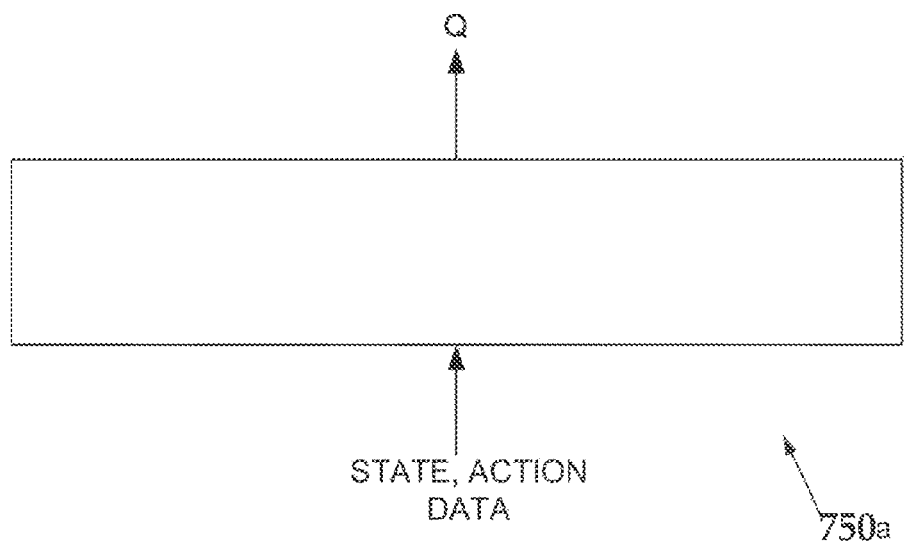
FIGS. 7a and 7b show alternative example configurations of Q-learning deep neural network according to an embodiment of the invention.
Figure 7B:
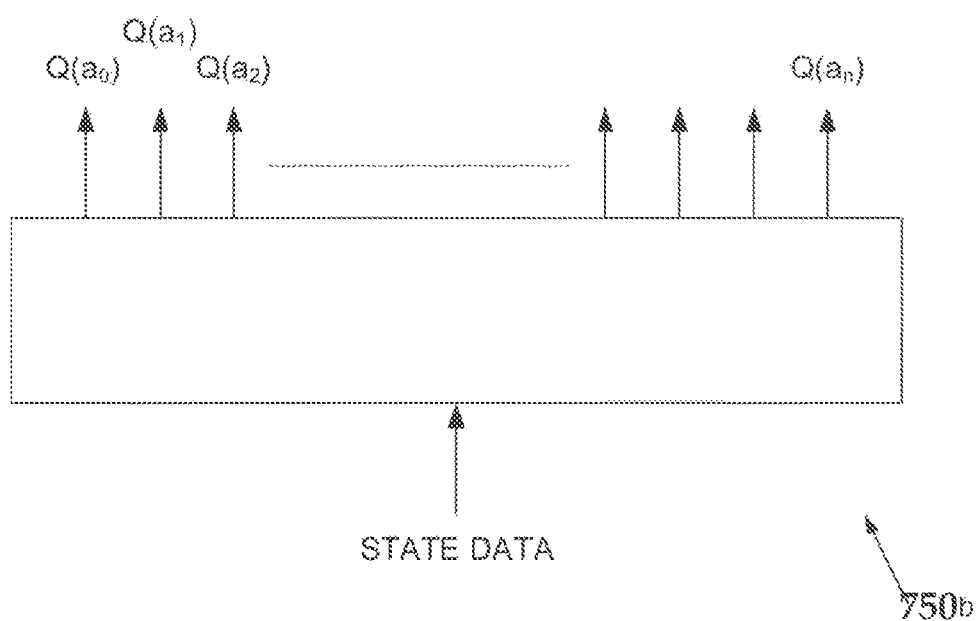

There are several potential ways of parameterizing Q using a neural network Since Q maps history-action pairs to scalar estimates of their Q-value, using both the history and the action have been used as inputs to the neural network is one option, illustrated schematically for neural network 750a in FIG. 7a. However a drawback of this type of architecture is that a separate forward pass is required to compute the Q-value of each action, resulting in a cost that scales linearly with the number of actions. Thus instead preferred embodiments employed an architecture in which there is a separate output unit for each possible action, and only the state representation is an input to the neural network. The outputs correspond to the predicted Q-values of the individual action for the input state, as shown schematically for neural network 750b in FIG. 7b. One advantage of this type of architecture is the ability to compute Q-values for all possible actions in a given state with only a single forward pass through the network.

In ideal embodiments, a function to compute the q value initializes hyperparameter with a discount factor, initializes q values as a list with a length of rewards. Q values are stored in an array. For each reward in the reward array, the q value is set to the sum of the reward and discount factor multiplied by the q value.

Figure 8:
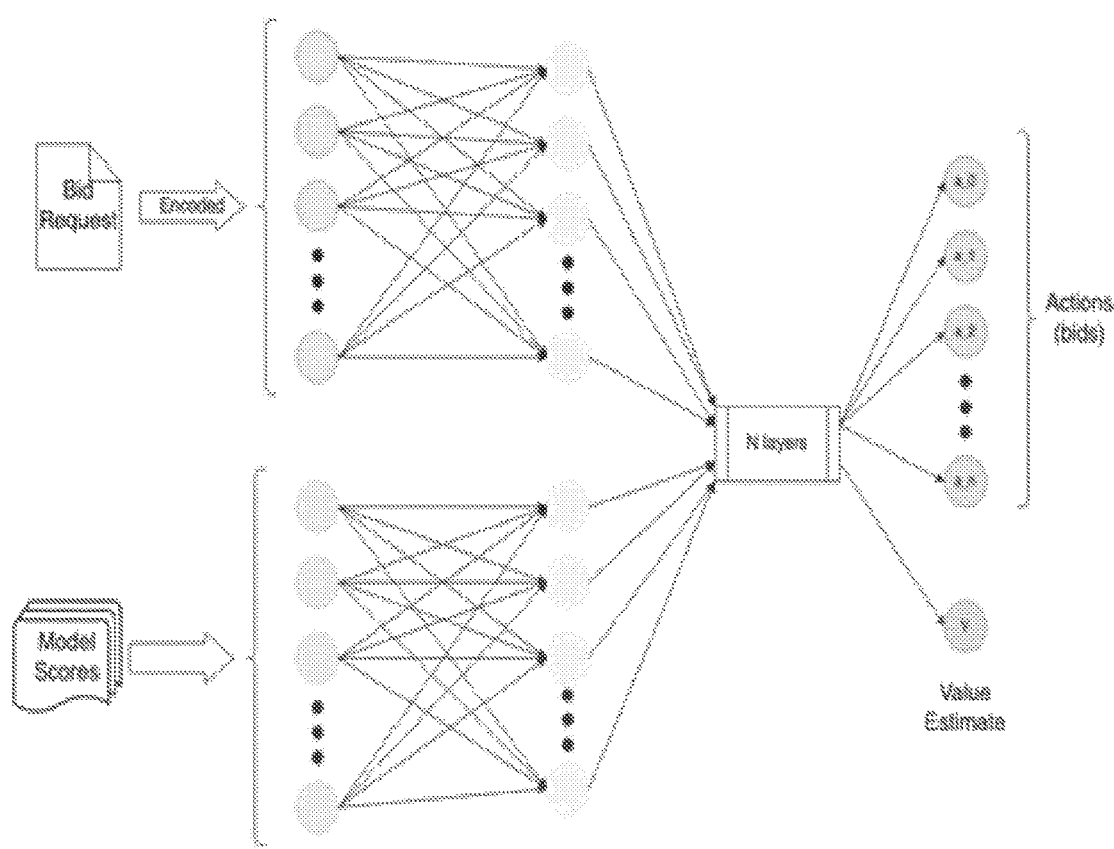
FIG. 8 shows a schematic of reinforcement learning according to embodiments of the invention.

The architecture used for training bid requests, illustrated in FIG. 8, is as follows: The input to the neural network comprises a series of bid requests. The bid requests are encoded and passed through a number of hidden layers. The first hidden layer convolves the input and applies a rectifier nonlinearity. The second hidden layer convolves stride, again followed by a rectifier nonlinearity. The final hidden layer is fully-connected and comprises a plurality of rectifier units. The output layer is a fully-connected linear layer with a single output for each valid action. The number of valid actions varied between 4 and 18 for the games considered. We refer to convolutional networks trained with the described approach as Deep Q-Networks (DQN). The output is seen as action bids. Similarly model scores are passed through hidden layers and create a value estimate.

Bids are ideally computed

```
Function: compute_bid(parameters: tactics, model, bid_request
    scores := apply models to bid_request
    For each tactic in tactics
        policy, value := Call apply_model with parameters
                        (model, bid_request, scores, tactic)
        bid := sample(policy)
    EndFor
    bid := max(bid)
    est_value := argmax(value) over tactics
    tactic := argmax(bid) over tactics
    return bid, est_value, tactic
```

In these ideal embodiments, training is further done online for each bidder. In these embodiments,

```
Function: train_online( )
    load model from disk
    load tactics from tactic cache
    initialize hyperparameters num_step, e_weight
    Loop forever
        initialize lists: values, rewards, log_probs
        initialize entropy to 0
        For step in num_steps
            request := Wait for bid request from ad exchange
            bid, est_value tactic := Call compute_bid with
                                (tactics, model, request)
            auction_result := respond to bid_request with bid
            reward := Call compute_reward with parameters
                      (tactic, auction_result)
            append reward to rewards
            append est_value to values
            append log(policy) to log_probs
            e := -sum(mean(policy) * log(policy))
            entropy := entropy + e
        EndFor
        // backprop over episode
        q_values := Call compute_q_values with parameters
                    (rewards[0:-1], rewards[-1])
        advantage := q_values = values
        actor_loss := mean(-log_probs * advantage)
        critic_loss = mean(0.5 * advantage^2)
        ac_loss = actor_loss + critic_loss + e_weight * entropy
        backpropagate ac_loss through model
        descend gradient
        reset gradients
    EndLoop
```

Thus referring to FIG. 8, this shows an embodiment of neural network 750 as described above in which a set of input frames 152 provides an input to a first set of convolutional filters 154 formed by connections to a first hidden layer 156. First hidden layer 156 contains a set of feature maps, one for each filter. A second set of convolutional filters 158 provides connections to a second hidden layer 160 which comprises a further set of feature maps, one for each of filters 158. The output stage of neural network 150 comprises, in effect, a multilayer perceptron with a set of input hidden units 162 connected to all the feature maps in layer 160 below, and having a set of output units 164, one for each available action (between 4 and 18 actions). The neural network structure of FIG. 8 corresponds to the arrangement shown in FIG. 7b, in which state data 152 presented at the input of the neural network generates a set of Q-value outputs on output units 164, one for each action.

Figure 9A:
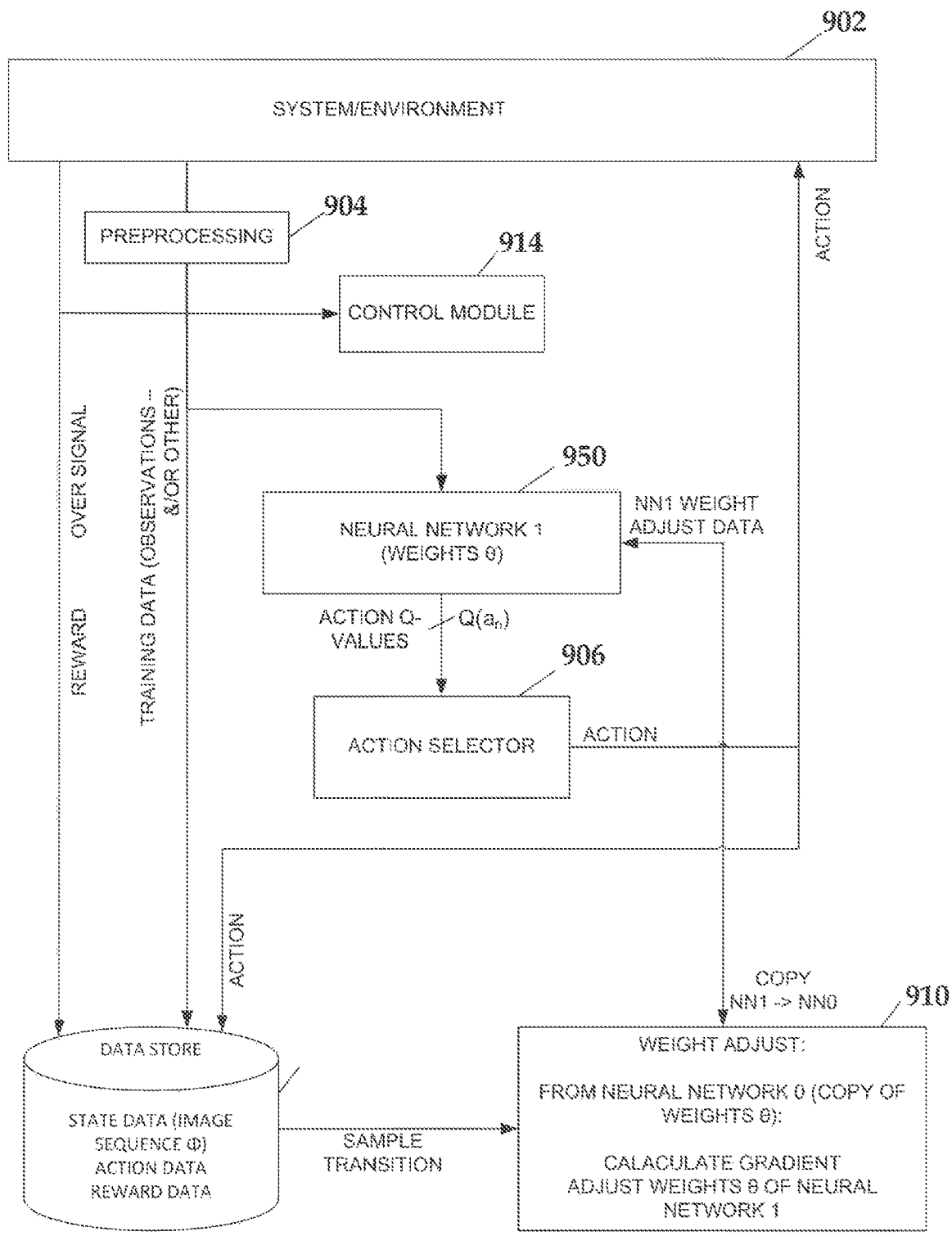
FIGS. 9a and 9b show, respectively, a block diagram of a reinforcement learning processor according to an embodiment of the invention and an example of a computer system programmed to implement a deep neural network based Q-learning procedure according to an embodiment of the invention.

FIG. 9a shows a schematic block diagram of a data processor 900 configured to implement a neural network-based reinforcement learning procedure as described above.

The processor interacts with some system 902, providing actions to control the system and observing ad placement and response from the system. In embodiments, there are also inputs to the processor from cost or reward data from the system. The observed data is pre-processed by module 904 and then processed by neural network 950 as previously described. This provides a set of action-value parameters (Q-values) as outputs for the observed input state. An action selector 906 selects the action with the maximum Q-value and provides this to a system 902 as well as to experience data store 908. The experience data store 908 stores the observed state data, for example image sequence data, selected actions, and reward data from system 902.

During a learning phase module 910 samples the transition from the experience data store 908 and adjusts the weights of neural network 950 (neural network 1) based on a target from neural network 0, an earlier copy of neural network 1 having weights stored in module 910. Thus in embodiments the actions selected by neural network 1 provide stored experience data from which neural network 0 draws, to provide targets for training neural network 1.

Figure 9B:
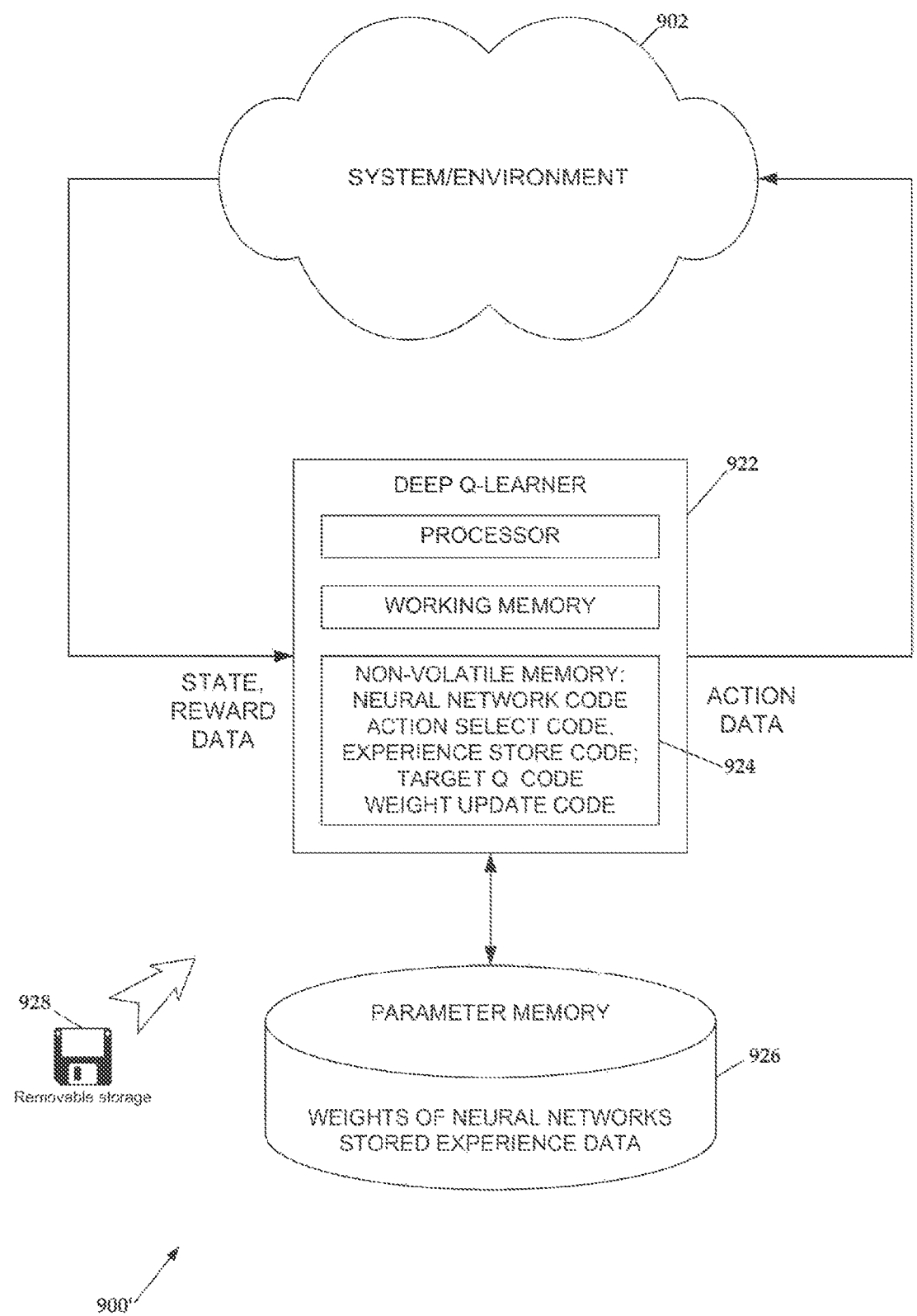

FIG. 9b shows a general purpose computer system 900' programmed to implement corresponding functions to those illustrated in FIG. 9b. Thus the system comprises a deep Q-learner 922 incorporating a processor, working memory, and non-volatile program memory 924. The program memory stores, inter alia, neural network code, action select code experience store code, target Q generation code and weight update code. Parameter memory 926 stores the weights of the neural networks and the experience data. The code 924 may be provided on a physical carrier medium such as disk 928.

In some embodiments, Asynchronous Advantage Actor Critic (A3C) algorithm is used for the reinforcement learning.

The invention claimed is:

1. A system for training a bidding model by reinforcement learning using first and second neural networks, the system configured to:
   perform operations, in response to an available inventory from a publisher relayed through a real time bid server, including processing a bid on the available inventory, the processing including:
   sending the bid to the real time bid server;
   receiving a bid result in response to the bid;
   storing state data including a sequence of bids sent to the real time bid server, the bid result, and a response rate for the available inventory;
   using the first neural network, determining a plurality of target action Q-values based on the state data, the plurality of target action Q-values including at least one Q-value for each possible action at a current state of the bid server;
   selecting an action based on a maximum target action Q-value;
   using a second machine learning model, determining a target Q-value for the selected action based on the state data and experience data, the experience data including the selected action and a reward earned for the selected action;
   training the first neural network to update the plurality of target action Q-values based on the target Q-value, the training using a stochastic gradient descent;
   calculating a plurality of losses; and
   back propagating the losses through the bidding model.

* * * * *

UNITED STATES PATENT AND TRADEMARK OFFICE
CERTIFICATE OF CORRECTION

PATENT NO. : 11,645,679 B2
APPLICATION NO. : 17/379959
DATED : May 9, 2023
INVENTOR(S) : Portman et al.

It is certified that error appears in the above-identified patent and that said Letters Patent is hereby corrected as shown below:

On the Title Page

Under item (56), in Column 2, under "Other Publications", Line 1, delete "etal" and insert --et al.-- therefor In the Specification In Column 7, Line 57, delete "APis)," and insert --APIs),-- therefor In Column 15, Line 50, delete "c" and insert --$\varepsilon$-- therefor In Column 17, Line 31, delete "c-greedy" and insert --$\varepsilon$-greedy-- therefor In Column 17, Line 31, delete "$0 \leq \varepsilon \leq 1$" and insert --$0 \leqq \varepsilon \leqq 1$-- therefor In Column 18, Line 32, after "network", insert --.--

In Column 19, Line 6, after "bid_request", insert --)--

In Column 19, Line 58, delete "laver" and insert --layer-- therefor

Signed and Sealed this
Twentieth Day of August, 2024

*Katherine Kelly Vidal*

Katherine Kelly Vidal
*Director of the United States Patent and Trademark Office*